(No Model.)

F. O. SUNDWALL & E. BLAKESLEE.
STEAM COOKER.

No. 473,096. Patented Apr. 19, 1892.

Witnesses:
Chas. E. Gaylord,
Clifford W. White.

Inventors,
Frank O. Sundwall,
Ezra Blakeslee,
By Banning & Banning & Payson,
Att'ys.

UNITED STATES PATENT OFFICE.

FRANK O. SUNDWALL, OF CHICAGO, AND EZRA BLAKESLEE, OF NEPONSET, ILLINOIS.

STEAM-COOKER.

SPECIFICATION forming part of Letters Patent No. 473,096, dated April 19, 1892.

Application filed August 18, 1891. Serial No. 403,069. (No model.)

*To all whom it may concern:*

Be it known that we, FRANK O. SUNDWALL, a citizen of the United States, residing at Chicago, Cook county, Illinois, and EZRA BLAKESLEE, a citizen of the United States, residing at Neponset, Bureau county, Illinois, have invented a new and useful Improvement in Steam-Cookers, of which the following is a specification.

The object of our invention is to provide a steam-cooker which shall be in various particulars an improvement upon and a simplification of the cookers previously in use.

One part of our invention consists in providing means for condensing the steam as it escapes from any or all of the compartments and returning the condensed steam to the hot-water chamber.

Still another part of our invention consists in providing means whereby the condensing steam is used to heat a body of water, which may be afterward introduced into the hot-water chamber, in this manner avoiding the introduction of any cold water into the latter chamber, which would tend to reduce the temperature of the water therein and interfere with the action of the cooker.

Our invention consists in the features and details of construction, hereinafter described and claimed.

Figure 1:
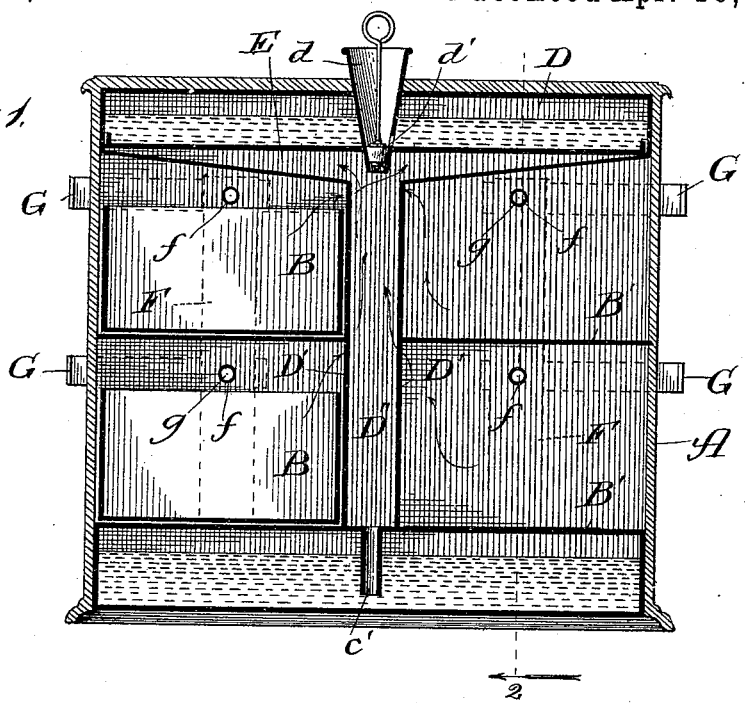
Figure 2:
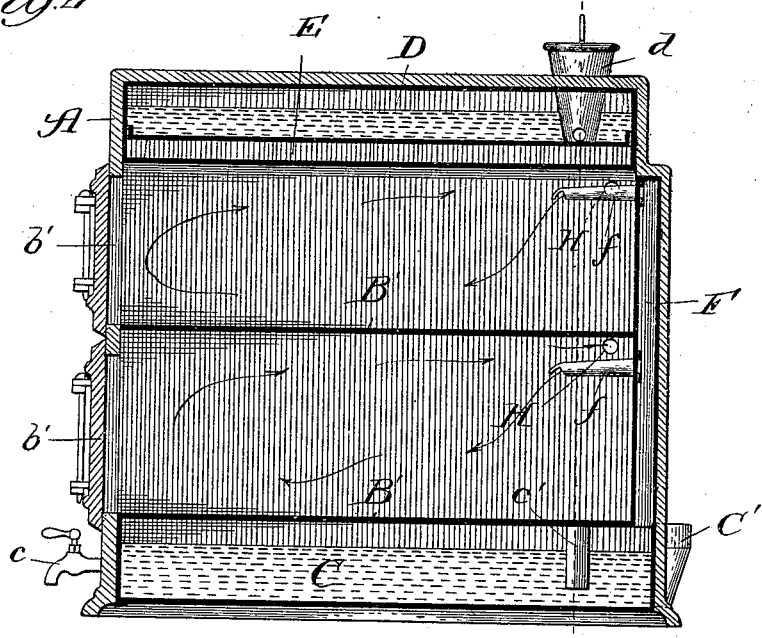

In the drawings, Figure 1 is a cross section of a cooker embodying our improvements, taken on line 1 of Fig. 2, looking in the direction of the arrow; and Fig. 2 is a similar section on line 2 of Fig. 1, looking in the direction of the arrow.

Our improved cooker may be made out of any suitable material—as, for instance, tin or sheet-iron—and of any desired form and dimensions.

When made in the form shown in the figures of the drawings, the cooker consists of an outer casing A, so divided as to form two drawers B at one side of the cooker and two shelves B' at the other side, the compartments formed by the shelves being closed by doors b', as shown. The lower part of the cooker is formed into a hot-water receptacle C, provided with a suitable faucet c, whereby the hot water may be drawn off, as desired. This chamber is also provided with a funnel or tube C', through which water is fed in. At the upper part of the cooker is preferably formed a cold-water chamber D, provided with a suitable funnel d, connecting with such cold-water chamber by a suitable opening. Inside of this funnel is a valve d', provided with an operating-rod.

Two partitions D' are placed in the cooker to form the passage D'', connecting with the hot-water chamber by means of a tube or pipe c', preferably extending to a point near the bottom of such chamber. The lower end of the funnel d of the cold-water chamber opens into this passage.

At a point near the top of the heater, preferably beneath the cold-water chamber, we form a condensing-chamber E, connecting, as shown, with the passage D'', the bottom of this chamber preferably inclining downward toward the passage to guide the condensed steam into the same.

In the preferred construction the hot-water chamber C extends out at the back of the heater and connects with any desired number of tubes or pipes F. These pipes preferably extend upward along the back of the heater, and are provided with nozzles f, one of which extends, as shown, into each of the chambers or compartments into which the heater is divided. To shut off and admit steam through these nozzles, valves G are provided, consisting of plates sliding in suitable guides and provided with orifices g, as shown, corresponding to the openings at the end of the nozzles. As will be obvious from an inspection of Fig. 2, these nozzles are provided with a downwardly-extending lip on their upper sides, adapted to throw the steam down to the bottom of the compartment and thereby insure a more thorough circulation of the same throughout such compartments.

The device having been constructed and put together in the manner shown and described operates as follows: Water may be first admitted to the chamber C by means of the opening or funnel C'. The water is then heated and steam generated. This steam then passes up through the pipe or pipes F and enters the various compartments or drawers by means of the nozzles *f*. When it is desired to shut the steam off of any of the chambers or drawers, the valve G corresponding to such chamber or drawer may be moved to close the nozzle, and when it is desired to admit steam to any chamber the valve may be opened. The steam escapes from the chambers by means of openings H, leading into the passage D″. Up this passage the steam passes and enters the condensing-chamber, wherein, being condensed, it returns again by means of the passage D″ and the pipe *c'* into the hot-water chamber. The chamber D being filled with cold water aids in condensing the steam; but after the cooker has been used for some time this water will of course become more or less heated, and when this occurs the valve *d'* may be raised and any desired quantity of water allowed to pass into the hot-water chamber, the cold water being replenished through the funnel *d*. By this means we provide a simple and efficient steam-cooker, so constructed that the steam can be admitted to or shut off of the various compartments or chambers thereof separately and at will, which is provided with means for condensing the steam and returning it to the hot-water chamber, and also with means for heating an additional supply of water to replenish the hot-water chamber as the water may be drawn off from the latter in use. It will further be seen that from the construction of our cooker none of the steam used in cooking the food will escape therefrom, but will all be retained inside of the cooker.

While we have been more or less precise in our description, we do not intend to limit ourselves to the exact form shown, but contemplate changes in form, proportion, and relative location of the parts and the substitution of equivalent members, as may be desirable or necessary. For instance, there may be any number of compartments in the cooker, and they may be differently arranged from those shown. There may be more or less than two pipes F, and each of such pipes may be provided with any desired number of nozzles. If desirable or necessary, there may be more than one nozzle for each chamber. The condensing-chamber may be placed at the end or side of the cold-water chamber instead of beneath it. There may be more than one of the passages D″, and similarly various changes may be made without departing from the spirit of our invention.

We claim—

1. In a steam-cooker, the combination of a hot-water chamber, cooking apartments above the same, a condenser located above such compartments, a cold-water chamber, the bottom whereof forms the top of the condensing-chamber, and a passage connecting the hot and cold water chambers and the condenser and connected with the compartments, whereby the steam generated in the hot-water chamber passes to the compartments and thence to the condenser, is condensed therein, heating the water in the cold-water chamber, and is then automatically returned in the form of water to the hot-water chamber, substantially as described.

2. In a steam-cooker, the combination of a hot-water chamber, a cold-water chamber, a passage connecting the two, and a funnel passing through the cold-water chamber and entering the connecting-passage, such funnel being provided with an opening into the cold-water chamber and a suitable valve, whereby water may be introduced through such funnel into the cold-water chamber without entering the passage, and afterward by raising the valve allowed to pass down such passage into the hot-water chamber, substantially as described.

3. In a steam-cooker, the combination of a hot-water chamber, various compartments placed above the same, one or more steam-pipes communicating with the hot-water chamber and provided with nozzles extending into the cooking-compartments, such nozzles being constructed, substantially as shown, to direct the steam toward the bottom of such compartments, substantially as described.

FRANK O. SUNDWALL.
    EZRA BLAKESLEE.

Witnesses as to the signature of Frank O. Sundwall:
 GEORGE S. PAYSON,
 SAMUEL E. HIBBEN.

Witnesses as to the signature of Ezra Blakeslee:
 N. C. BURWELL,
 C. H. LEWIS.